United States Patent [19]
Wolfe

[11] 3,762,056
[45] Oct. 2, 1973

[54] APPARATUS FOR MEASURING THE THICKNESS OF A BUFFED TIRE CASING

[75] Inventor: Merritt W. Wolfe, Akron, Ohio

[73] Assignee: The Goodyear Tire & Rubber Company, Akron, Ohio

[22] Filed: July 21, 1971

[21] Appl. No.: 164,541

[52] U.S. Cl. ............................ 33/143 D, 33/174 PA
[51] Int. Cl. ............................................... G01b 5/02
[58] Field of Search..................... 33/143, 147, 148, 33/149, 174, 165

[56] References Cited
UNITED STATES PATENTS

| | | | |
|---|---|---|---|
| 3,237,310 | 3/1966 | Reiner | 33/143 D |
| 2,634,506 | 4/1953 | Strand | 33/148 E |
| 825,648 | 7/1906 | Haworth | 33/143 F |
| 3,102,344 | 9/1963 | Herman | 33/174 PA |

FOREIGN PATENTS OR APPLICATIONS

| | | | |
|---|---|---|---|
| 10,617 | 0/1908 | Great Britain | 33/143 F |

Primary Examiner—Harry N. Haroian
Attorney—F. W. Brunner et al.

[57] ABSTRACT

An apparatus for measuring the thickness of a buffed tire casing to determine if a sufficient amount of rubber has been removed from the casing and the casing is suitable for retreading. The apparatus has a mandrel on which the buffed casing is mounted and supported while the measurement is made. A tensioning device moves the casing into compressive engagement with the mandrel where the thickness of the casing can be more accurately measured. A plurality of adjustable fingers, calibrated in relation to the mandrel and sufficient in number to simultaneously measure the thickness of the casing at the centerline and opposing shoulders of the casing, are moved into position and adjusted to contact the outer periphery of the buffed casing to determine if the buffed casing is suitable for retreading.

8 Claims, 3 Drawing Figures

PATENTED OCT 2 1973 3,762,056
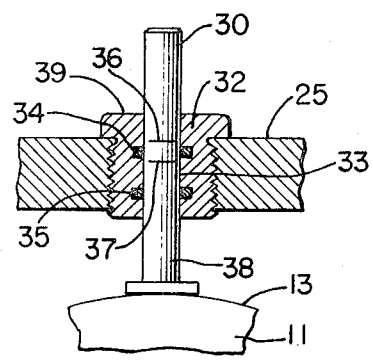
FIG. 2
FIG. 1
FIG. 3
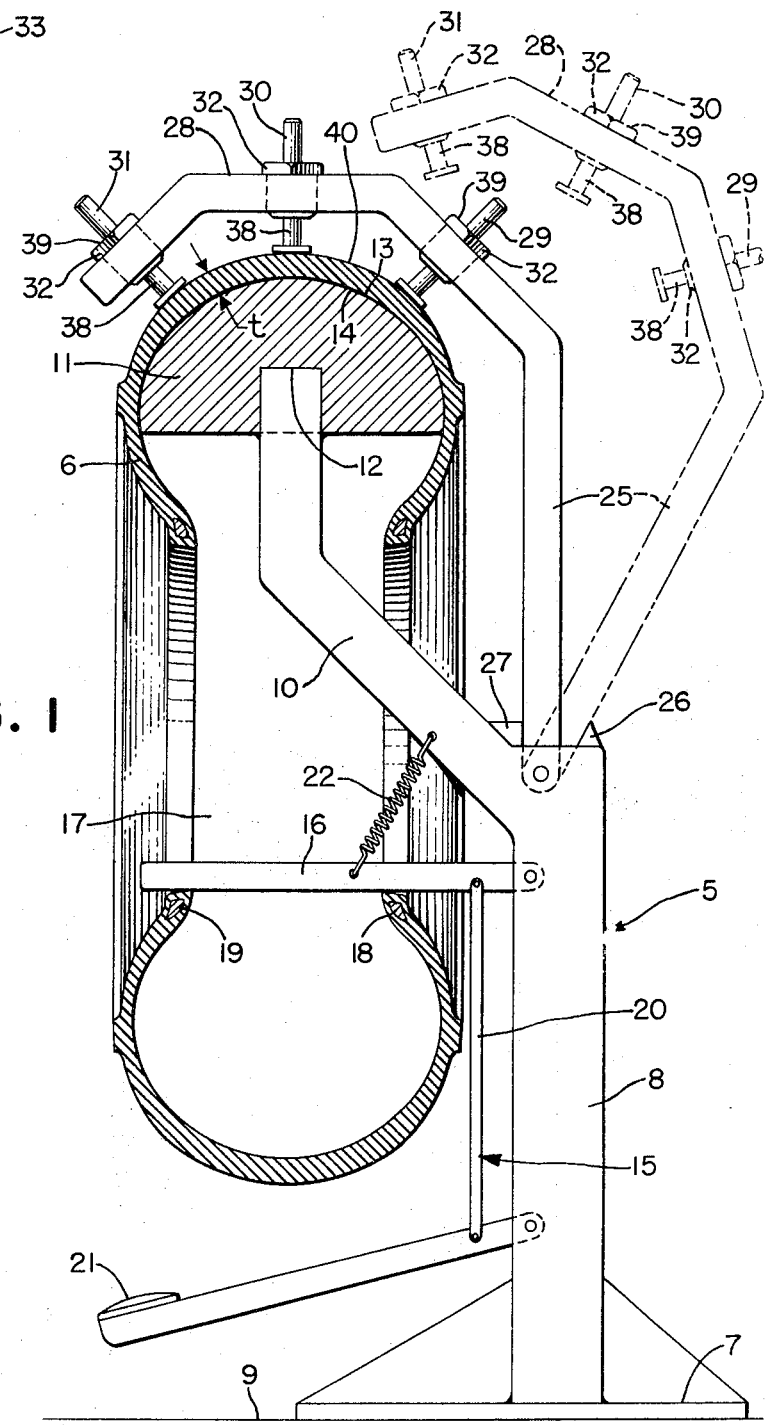

APPARATUS FOR MEASURING THE THICKNESS OF A BUFFED TIRE CASING

BACKGROUND OF THE INVENTION

The retreading of tires has become more critical in recent years because of the higher speeds at which automobiles travel for prolonged periods of time. This is especially true regarding the removal of rubber in the shoulder area, i.e. the juncture between the tread and sidewalls of the tire. It has been found that too little or too much rubber in this area can cause the new tread to separate from the old casing when the tire operates at high speeds. It has become necessary to accurately measure the thickness of the buffed tire casing in these critical areas. At present, many buffed tire casings are measured with large, clumsy, caliper-type measuring devices. Such methods are very time consuming and costly, and usually not precise enough to meet today's standards. The invention is directed to a mechanical apparatus for accurately determining, within limits, the thickness of a properly buffed tire casing, especially in the area of the shoulders and mid-circumferential centerline of the casing.

Briefly stated, the invention is in an apparatus for measuring the thickness of a buffed tire casing. The apparatus essentially comprises a mandrel on which a buffed tire casing is mounted and supported. The mandrel has a curved outer surface for engaging the inner periphery or crown of the tire casing. Any suitable mechanism may be used for causing relative movement between the mandrel and tire casing mounted on the mandrel, such that the casing and mandrel move into tighter compressive engagement where the thickness of the casing can be more accurately measured. At least one finger, calibrated in relation to the mandrel, is moved into position for engaging the outer periphery of the tire casing and measuring the distance between the outer periphery at that spot and an opposing point on the curved surface of the mandrel.

DESCRIPTION OF THE DRAWING

The following description of the invention will be better understood by having reference to the annexed drawing, wherein:

FIG. 1 is a side view of a measuring apparatus made in accordance with the invention;

FIG. 2 is an enlarged detailed view of an adjustable finger calibrated in relation to the mandrel of the apparatus; and FIG. 3 is a side view of the mandrel.

DESCRIPTION OF THE INVENTION

Referring to the drawing, there is shown an apparatus 5 for measuring the thickness t of a buffed tire casing 6, especially at the centerline and opposing shoulders of the casing 6. The apparatus comprises a base 7, an upstanding frame 8 extending vertically from the base 7, when the base 7 is resting on a horizontally disposed surface or floor 9. A crooked leg 10 extends upwardly in offset relation from the frame 8.

A rigid mandrel 11, composes of any suitable metal, is mounted on the free end 12 of the bent leg 10. The mandrel 11 has a curved outer periphery or surface 13 for contacting at least a portion of the inner periphery or crown 14 of the buffed tire casing 6, when the casing is mounted on the mandrel, as shown in FIG. 1. The mandrel 11, as seen in FIG. 3, is a relatively short arcuate segment having a radius of curvature suitable for engaging most tires without radically distorting the tire casing 6.

Any suitable mechanism 15 for tensioning the tire casing 6 on the mandrel 11, may be used to cause relative movement between the mandrel 11 and tire casing 6, mounted on the mandrel, whereby the tire casing 6 is moved into snug fitting relation with the mandrel 11 where the inner crown 14 of the casing 6 compressively engages the outer curved periphery 13 of the mandrel 11. The thickness t of the buffed tire casing 6 is measured more accurately when the tire casing is held in this particular position. The tensioning mechanism 15, in this particular case, comprises a bar 16 which is pivotally mounted on the upright frame 8 and extends therefrom for passage through the opening 17 of the tire casing 6 adjacent the circular beads 18 and 19 of the tire casing 6. A link arm 20 couples the the bar 16 with a foot pedal 21 which is also pivotally mounted on the upright frame 8. A coil spring 22 is provided for biasing the bar 16 out of contact with the beads 18 and 19 of the tire casing 6, until the foot pedal 21 is depressed.

A pivot arm 25 is mounted on the upright frame 8 for reciprocating motion towards and away from the mandrel 11. A pair of stops 26 and 27 are provided for limiting the rotational movement of the pivot arm 25. The pivot arm 25, as seen in dotted position in FIG. 1, may be rotated out of interfering relation with mounting of the tire on, and removal of the tire from, the mandrel 11. The free end 28 of the pivot arm 25 is configured to closely approximate the transverse curvature of the outer periphery 13 of the mandrel 11. The pivot arm 25 carries a plurality of calibrated, adjusting screws or fingers 29, 30, and 31, for simultaneously measuring the thickness t of the buffed tire casing 6 at the mid-centerline and opposing shoulders of the casing 6.

A coupling 32 is interposed between the pivot arm 25 and each of the fingers 29–31. The couplings 32 threadably engage the pivot arm 25 and have similar axial bores 33 for slidably receiving the fingers 29–31. A plurality of rubber 0-rings 34 and 35 are mounted within the bores 33 of the couplings 32 for frictionally engaging the fingers 29–31. The fingers 29–31 are reciprocable, by hand, in an axial direction towards and away from the mandrel 11. The fingers 29–31 are each calibrated in relation to the outer curved periphery 13 of the mandrel 11. A simple way to determine whether a sufficient amount of rubber has been removed from the buffed tire casing 6, i.e. completely removing the worn tread, is to place a pair of calibration marks 36 and 37 in spaced relation on the shaft 38 of each of the fingers 29–31, such marks 36 and 37 denoting the maximum and minimum tolerances for removal of rubber which can be readily ascertained from the building records of the size and type tire being buffed for retreading. The calibration marks 36 and 37 are designed for alignment with the outer exposed surface 39 of each of the couplings 32. Thus, by visually observing where the calibration marks 36 and 37 fall in relation to the surface 39, the operator can easily determine whether a sufficient amount of rubber has been removed from the buffed tire casing 6 in the critical areas of the mid-centerline and opposing shoulders. The foot pedal 21 can be released and the buffed tire casing 6 rotated to a new position on the mandrel 11, such that the thickness t of the buffed tire casing 6 can be measured at several points around the outer buffed periphery 40 of the casing 6.

Thus, there has been provided a mechanical device for accurately measuring the thickness of a buffed tire casing to determine if a sufficient amount of rubber, i.e. the worn tread, has been removed. As previously indicated, this measurement is extremely critical in the shoulder area of the tire. It is also desirable to measure the tire at the mid-centerline and measurements taken at these three points are usually sufficient to determine whether the buffed casing is suitable for retreading. The buffed casing, after measuring, is demounted from the apparatus and returned either to the buffing machine for more buffing, if required, or sent to another station where a new tread is applied to the properly buffed tire carcass.

What is claimed is:

1. An apparatus for measuring the thickness of a buffed tire casing, comprising:
    a. a rigid mandrel on which a buffed tire casing is mounted, the mandrel having an outer curved surface for contacting at least a portion of the inner crown of the casing;
    b. means for causing relative movement between the mandrel and a tire casing mounted on the mandrel, such that the surface and portion of the inner crown compressibly engage each other;
    c. a plurality of fingers calibrated in relation to the mandrel for measuring the thickness of a buffed tire casing at the shoulders and mid-circumferential centerline thereof, the fingers being movable to positions adjacent said shoulders and centerline of a buffed tire casing mounted on the mandrel;
    d. means for individually mounting the fingers for separate axial movement; and
    e. means for mounting the fingers for unitary movement into and out of said positions.

2. The apparatus of claim 1, wherein the means (e) for mounting the fingers for unitary movement includes an arm, means for mounting the arm for rotation towards and away from the mandrel, and means for mounting the fingers in spaced relation on the arm.

3. The apparatus of claim 2, which includes a pair of stops for limiting rotation of the arm relative to the mandrel.

4. The apparatus of claim 3, wherein the means (d) for individually mounting the fingers includes a separate collar having an axial bore for receiving each of the fingers, means for mounting the collars in predetermined spaced relation on the arm, and means for maintaining the fingers in the bores of the collars while allowing the fingers to move in an axial direction.

5. The apparatus of claim 1, wherein the means (b) for causing relative movement between the mandrel and a buffed tire casing mounted thereon, includes a bar for engaging a portion of the tire beads in opposite spaced relation from the mandrel, and means for moving the bar in a direction away from the mandrel.

6. The apparatus of claim 1, which includes means for calibrating the fingers in relation to the outer curved surface of the mandrel.

7. An apparatus for measuring the thickness of a buffed tire casing, comprising:
    a. a rigid mandrel on which a buffed tire casing is mounted, the mandrel having an outer curved surface for contacting at least a portion of the inner crown of a buffed tire casing mounted thereon;
    b. an arm movable to a position where the arm extends laterally across the mandrel in spaced relation from the surface, the arm being configured to proximate the transverse curvature of the mandrel;
    c. means for mounting the arm for rotation into and out of said position;
    d. a plurality of fingers disposed in spaced relation on the arm for contacting the buffed periphery of a tire casing at the shoulders and mid-centerline of the casing;
    e. means for individually mounting the fingers on the arm for separate axial movement;
    f. means for calibrating the fingers in relation to the curved surface of the mandrel for measuring the thickness of a buffed tire casing at the shoulders and centerline thereof; and
    g. means for causing relative movement between the mandrel and a buffed tire mounted thereon, to press the casing against the mandrel.

8. The apparatus of claim 7, which includes three fingers for engaging the outer buffed periphery of a tire casing at three aligned points, including the mid-centerline and opposing shoulders of the casing.

* * * * *